US008311981B2

(12) United States Patent
Braginsky et al.

(10) Patent No.: US 8,311,981 B2
(45) Date of Patent: *Nov. 13, 2012

(54) CONFLICT MANAGEMENT DURING DATA OBJECT SYNCHRONIZATION BETWEEN CLIENT AND SERVER

(75) Inventors: David E. Braginsky, Mountain View, CA (US); Justin M. Rosenstein, Oakland, CA (US); Eric Joseph Uhrhane, Palo Alto, CA (US); David Jeske, San Francisco, CA (US)

(73) Assignee: Google Inc., Mountain View, CA (US)

( * ) Notice: Subject to any disclaimer, the term of this patent is extended or adjusted under 35 U.S.C. 154(b) by 143 days.

This patent is subject to a terminal disclaimer.

(21) Appl. No.: 12/435,317

(22) Filed: May 4, 2009

(65) Prior Publication Data

US 2009/0216815 A1 Aug. 27, 2009

Related U.S. Application Data

(63) Continuation of application No. 11/323,198, filed on Dec. 30, 2005, now Pat. No. 7,529,780.

(51) Int. Cl.
*G06F 7/00* (2006.01)
(52) U.S. Cl. .................. 707/618; 707/611; 707/620
(58) Field of Classification Search .................. None
See application file for complete search history.

(56) References Cited

U.S. PATENT DOCUMENTS

| | | | |
|---|---|---|---|
| 5,675,802 A | 10/1997 | Allen et al. | 395/703 |
| 5,787,413 A | 7/1998 | Kauffman et al. | 707/2 |
| 6,078,925 A | 6/2000 | Anderson et al. | 707/103 |
| 6,324,544 B1 * | 11/2001 | Alam et al. | 1/1 |
| 6,430,576 B1 * | 8/2002 | Gates et al. | 1/1 |
| 6,438,563 B1 | 8/2002 | Kawagoe | 707/201 |
| 6,526,434 B1 | 2/2003 | Carlson et al. | 709/203 |
| 6,757,696 B2 | 6/2004 | Multer et al. | 707/201 |
| 6,823,360 B2 | 11/2004 | Copeland et al. | 709/203 |
| 6,842,768 B1 | 1/2005 | Shaffer et al. | 709/203 |

(Continued)

OTHER PUBLICATIONS

Examiner's Answer for Related U.S. Appl. No. 11/323,199, Notification Date Mar. 29, 2011, 32 pages.

(Continued)

*Primary Examiner* — Pierre Vital
*Assistant Examiner* — Mohammad S Rostami
(74) *Attorney, Agent, or Firm* — Morgan, Lewis & Bockius LLP

(57) ABSTRACT

A client stores client metadata entries corresponding to a plurality of data objects. During a first phase of a synchronization process, the client sends one or more client metadata entries to a server. Each client metadata entry sent corresponds to a data object for which at least one metadata parameter has changed since a prior execution of the synchronization process. During a second phase of the synchronization process, the client receives from the server one or more server metadata entries, each having at least one parameter that has changed since a prior execution of the synchronization process. The client identifies any received server metadata entry that conflicts with a corresponding client metadata entry, requests a user to select from among a predefined set of conflict resolutions to resolve the conflict, and the performs an action in accordance with the conflict resolution selected by the user.

48 Claims, 9 Drawing Sheets

U.S. PATENT DOCUMENTS

| | | | |
|---|---|---|---|
| 6,993,522 B2 | 1/2006 | Chen et al. ............................ 707/7 |
| 7,024,429 B2 | 4/2006 | Ngo et al. ...................... 707/201 |
| 7,024,430 B1 | 4/2006 | Ingraham et al. .............. 707/201 |
| 7,124,151 B1 | 10/2006 | Choi .............................. 707/201 |
| 7,155,465 B2 | 12/2006 | Lee et al. ....................... 707/204 |
| 7,203,708 B2 | 4/2007 | Liu et al. ....................... 707/200 |
| 7,240,091 B1* | 7/2007 | Hopmann et al. ............. 709/203 |
| 7,293,049 B2 | 11/2007 | Kadyk et al. .................. 707/204 |
| 7,315,978 B2 | 1/2008 | Giles .......................... 715/500.1 |
| 7,395,394 B2 | 7/2008 | Federa et al. .................. 711/163 |
| 2002/0019935 A1 | 2/2002 | Andrew et al. ................ 713/165 |
| 2002/0069192 A1 | 6/2002 | Aegerter ............................ 707/1 |
| 2002/0194205 A1* | 12/2002 | Brown et al. .................. 707/200 |
| 2004/0122870 A1 | 6/2004 | Park et al. ..................... 707/201 |
| 2004/0202348 A1 | 10/2004 | Kuzma ........................... 382/100 |
| 2004/0243644 A1 | 12/2004 | Steere et al. .................. 707/200 |
| 2005/0086390 A1 | 4/2005 | Banerjee et al. .............. 709/250 |
| 2005/0177617 A1* | 8/2005 | Banginwar et al. ........... 709/203 |
| 2005/0203962 A1 | 9/2005 | Zhou et al. .................... 707/200 |
| 2005/0216524 A1 | 9/2005 | Gomes et al. ................. 707/201 |
| 2005/0256907 A1* | 11/2005 | Novik et al. ................... 707/200 |
| 2006/0015539 A1* | 1/2006 | Wolf et al. ..................... 707/201 |
| 2006/0031264 A1 | 2/2006 | Bosworth et al. ............. 707/200 |
| 2006/0041596 A1 | 2/2006 | Stirbu et al. ................... 707/200 |
| 2006/0080353 A1 | 4/2006 | Miloushev et al. ........... 707/102 |
| 2006/0106879 A1 | 5/2006 | Zondervan et al. ........... 707/200 |
| 2006/0123010 A1* | 6/2006 | Landry et al. ................... 707/10 |
| 2006/0136511 A1 | 6/2006 | Ngo et al. ...................... 707/203 |
| 2006/0155945 A1* | 7/2006 | McGarvey ..................... 711/162 |
| 2006/0242444 A1* | 10/2006 | Novik et al. ................... 713/400 |
| 2007/0073766 A1* | 3/2007 | Porter ......................... 707/103 R |
| 2008/0046476 A1 | 2/2008 | Anderson et al. ............. 707/200 |
| 2008/0133922 A1 | 6/2008 | Williams ....................... 713/176 |
| 2009/0307277 A1 | 12/2009 | Grubov et al. ................. 707/703 |

OTHER PUBLICATIONS

Notice of Allowance for Related U.S. Appl. No. 11/323,198, Date Mailed Jan. 8, 2009, 26 pages.

Office Action for Related U.S. Appl. No. 11/323,198, Date Mailed Jul. 18, 2008, 38 pages.

Office Action for Related U.S. Appl. No. 11/323,198, Date Mailed Jan. 31, 2008, 24 pages.

Office Action for Related U.S. Appl. No. 11/323,199, Notification Date Jan. 8, 2008, 15 pages.

Office Action for Related U.S. Appl. No. 11/323,199, Notification Date Aug. 9, 2010, 19 pages.

Office Action for Related U.S. Appl. No. 11/323,199, Notification Date Aug. 17, 2009, 18 pages.

Office Action for Related U.S. Appl. No. 11/323,199, Notification Date Feb. 17, 2009, 15 pages.

Office Action for Related U.S. Appl. No. 11/323,199, Notification Date Jan. 21, 2010, 19 pages.

Office Action for Related U.S. Appl. No. 11/323,199, Notification Date Jul. 29, 2008, 17 pages.

Office Action for Related U.S. Appl. No. 12/242,811, Notification Date Jul. 6, 2011, 11 pages.

Office Action for Related U.S. Appl. No. 12/242,811, Notification Date Jan. 19, 2011, 19 pages.

Office Action for Related U.S. Appl. No. 12/242,818, Notification Date Aug. 3, 2011, 54 pages.

Office Action for Related U.S. Appl. No. 12/435,317, Notification Date May 13, 2011, 49 pages.

Office Action for Related U.S. Appl. No. 12/435,317, Notification Date Nov. 17, 2010, 46 pages.

* cited by examiner

Metadata Entry for DO₁

| DO₁ Identifier | | | |
|---|---|---|---|
| | Client Metadata Entry | Server Metadata Entry | Last Server Metadata Entry |
| Version No. | | | |
| Name | Name | Name | Name |
| Synched/ Unsynched | Synched/ Unsynched | Synched/ Unsynched | Synched/ Unsynched |
| Deleted Flag | Deleted Flag | Deleted Flag | Deleted Flag |
| Path | Path | Path | Path |
| Size | Size | Size | Size |
| Permissions | Permissions | Permissions | Permissions |
| Checksum | Checksum | Checksum | Checksum |

FIG. 2B

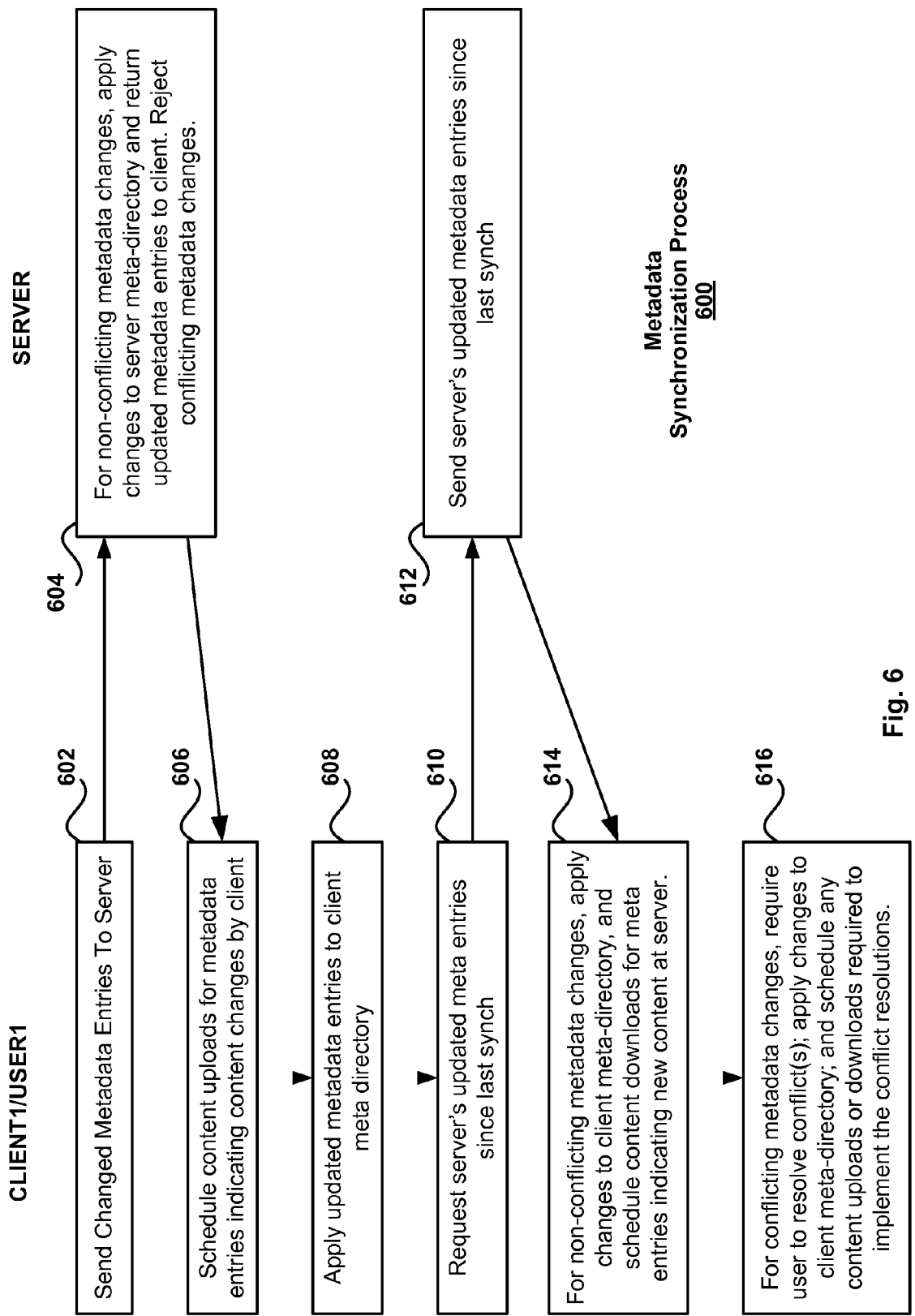

CONFLICT MANAGEMENT DURING DATA OBJECT SYNCHRONIZATION BETWEEN CLIENT AND SERVER

RELATED APPLICATIONS

This application is a continuation of the U.S. patent application Ser. No. 11/323,198, filed Dec. 30, 2005 now U.S. Pat. No. 7,529,780, entitled "Conflict Management during Data Object Synchronization Between Client and Server, which application is incorporated by reference herein in its entirety.

This application is related to U.S. patent application Ser. No. 11/323,199, filed Dec. 30, 2005, entitled "Locally Cached File System," which application is incorporated by reference herein in its entirety.

TECHNICAL FIELD

The embodiments disclosed herein relate to synchronizing data files, and in particular to systems and methods for managing shared data conflicts across multiple different computing devices.

BACKGROUND

Data conflicts typically occur when users access data stored in enterprise information storage and retrieval systems and when users synchronize data between different computing devices. Such computerized information storage and retrieval systems typically allow one user at a time to access and modify any particular data file stored in the system. For example, while a first user has a data file checked-out, other users are prevented from checking-out the same file and modifying it. However, other users may still view, copy or print the document, while it is checked-out. Such systems do not require sophisticated conflict resolution mechanisms, as any single data file may only be modified by one user at a time.

Other systems that require synchronizing two different data files on two different computing devices require more sophisticated conflict resolution mechanisms. Most of the time, conflicts arise because the same data file has been altered on both computing devices. For example, a user changes a calendar entry on his Personal Digital Assistant (PDA), while the user's secretary concurrently changes the same calendar entry on a corporate server. During synchronization, the user is typically presented with a choice of which file to keep, e.g., the file on the PDA or the file on the desktop computer. These types of conflict resolution procedures are typically limited to the same user using two separate devices, but do not address conflicts that arise between multiple users using multiple different devices.

In light of the above, it would be highly desirable to provide a system and method for managing conflicts that arise when multiple different users and/or computing devices have access to the same data files.

SUMMARY OF DISCLOSED EMBODIMENTS

According to some embodiments there is provided a computer implemented method for managing shared data conflicts. In one aspect of the method, a client stores client metadata entries corresponding to a plurality of data objects. During a first phase of a synchronization process, the client sends one or more client metadata entries to a server. Each client metadata entry sent corresponds to a data object for which at least one metadata parameter has changed since a prior execution of the synchronization process. During a second phase of the synchronization process, the client receives from the server one or more server metadata entries, each having at least one parameter that has changed since a prior execution of the synchronization process. The client identifies any received server metadata entry that conflicts with a corresponding client metadata entry, requests a user to select from among a predefined set of conflict resolutions to resolve the conflict, and the performs an action in accordance with the conflict resolution selected by the user.

In some embodiments, another aspect of the method includes a server that stores server metadata entries corresponding to a plurality of data objects. During a first phase of a synchronization process, the server receives one or more client metadata entries from the client, each of the client metadata entries corresponding to a data object for which at least one metadata parameter has changed since a prior execution of the synchronization process. During the first phase of the synchronization process, the server rejects any received client metadata entry that contains one or more updated metadata parameters that conflicts with metadata parameters of a corresponding server metadata entry, and accepts any received client metadata entry that does not conflict a corresponding server metadata entry. During a second phase of the synchronization process, the server sends to the client one or more server metadata entries, each of the server metadata entries corresponding to a data object for which at least one metadata parameter has changed since a prior execution of the synchronization process.

BRIEF DESCRIPTION OF THE DRAWINGS

For a better understanding of the nature and objects of the invention, reference should be made to the following detailed description taken in conjunction with the accompanying drawings, in which:

FIG. 2B is a schematic representation of a single metadata entry on the client computer shown in FIG. 2A, according to an embodiment of the invention;

FIG. 6 is a flow chart of one embodiment of a metadata synchronization process.

Like reference numerals refer to the same or similar components throughout the several views of the drawings.

DETAILED DESCRIPTION OF THE EMBODIMENTS

The following describes various embodiments of a system and method for managing data conflicts. In particular, the described embodiments manage shared data conflicts between multiple versions of a shared data object.

Figure 1:
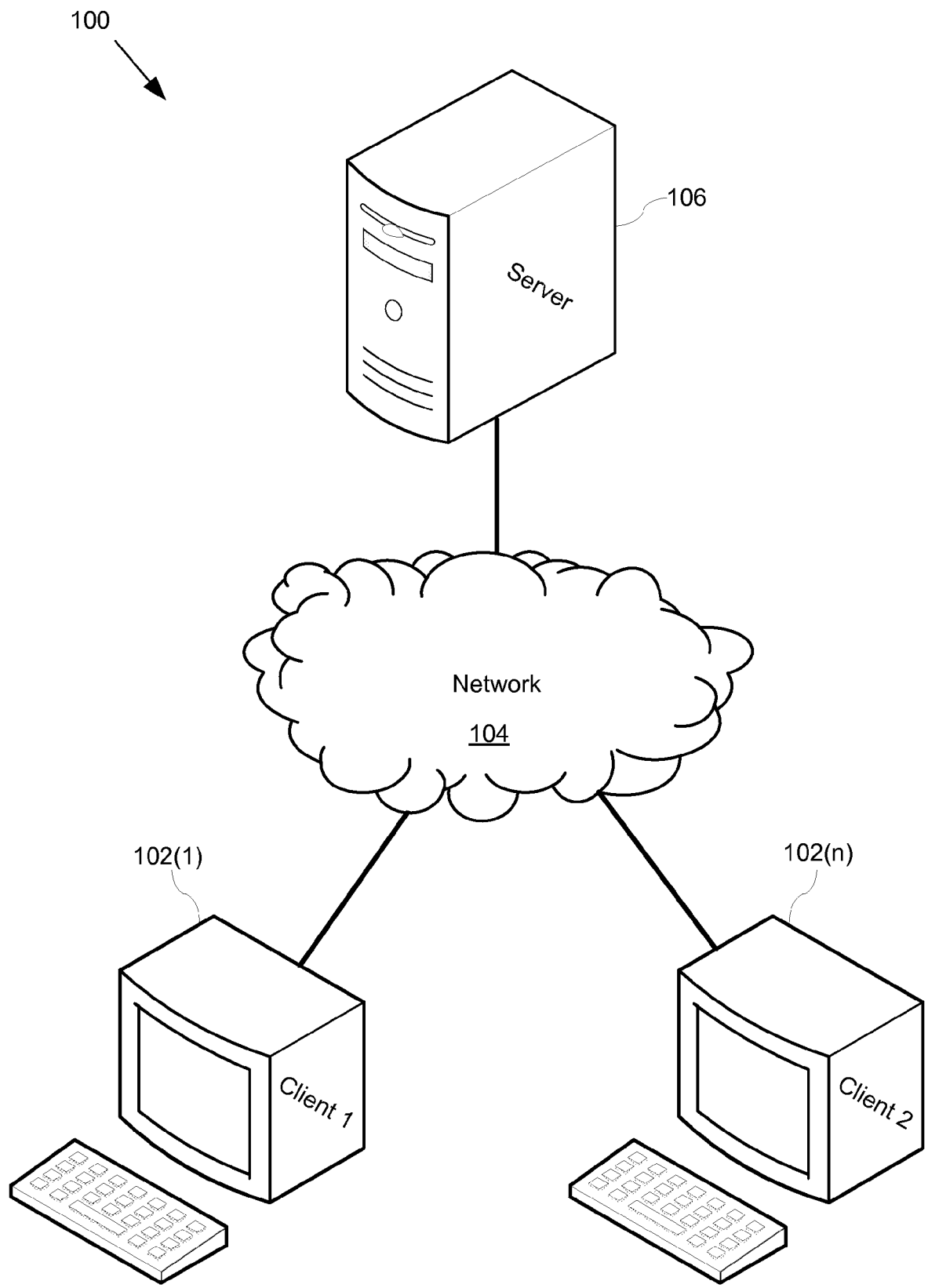
FIG. 1 is a schematic diagram of the architecture of a system for managing data conflicts, according to an embodiment of the invention.

FIG. 1 is a schematic diagram of the architecture 100 of a system for managing data conflicts. The system includes one or more client computers 102(1)-(n) electronically coupled to a network 104. In some embodiments, the client computers 102(1)-(n) are desktop computers, while in other embodiments, the client computers 102(1)-(n) are any other type of computing device, such as laptop computers, handheld computers, personal digital assistants (PDAs), cellular telephones, set-top boxes or the like. Also in some embodiments, the network 104 is a wide area network (WAN), such as the Internet, while in other embodiments the network is any other suitable network, such as a local area network (LAN) or the like.

A server 106 is also electrically coupled to the network, such that the client computers 102(1)-(n) can communicate with the server 106 via the network 104.

In use, the server acts as a virtual file repository or disk drive for the client computers 102(1)-(n), i.e., the local client computers and the server store synchronized copies of various data objects. Data objects as used herein are any collection of related data or program records stored as a unit, such as folders, data files, email messages, instant messages, text documents, word processing documents, figures, databases or the like. Where possible, e.g., where the client and server are connected via the network, local data objects on the client computers and server data objects on the server are synchronized, subject to the conflict resolution procedures described below in relation to FIGS. 4A, 4B, 5A and 5B.

Figure 2A:
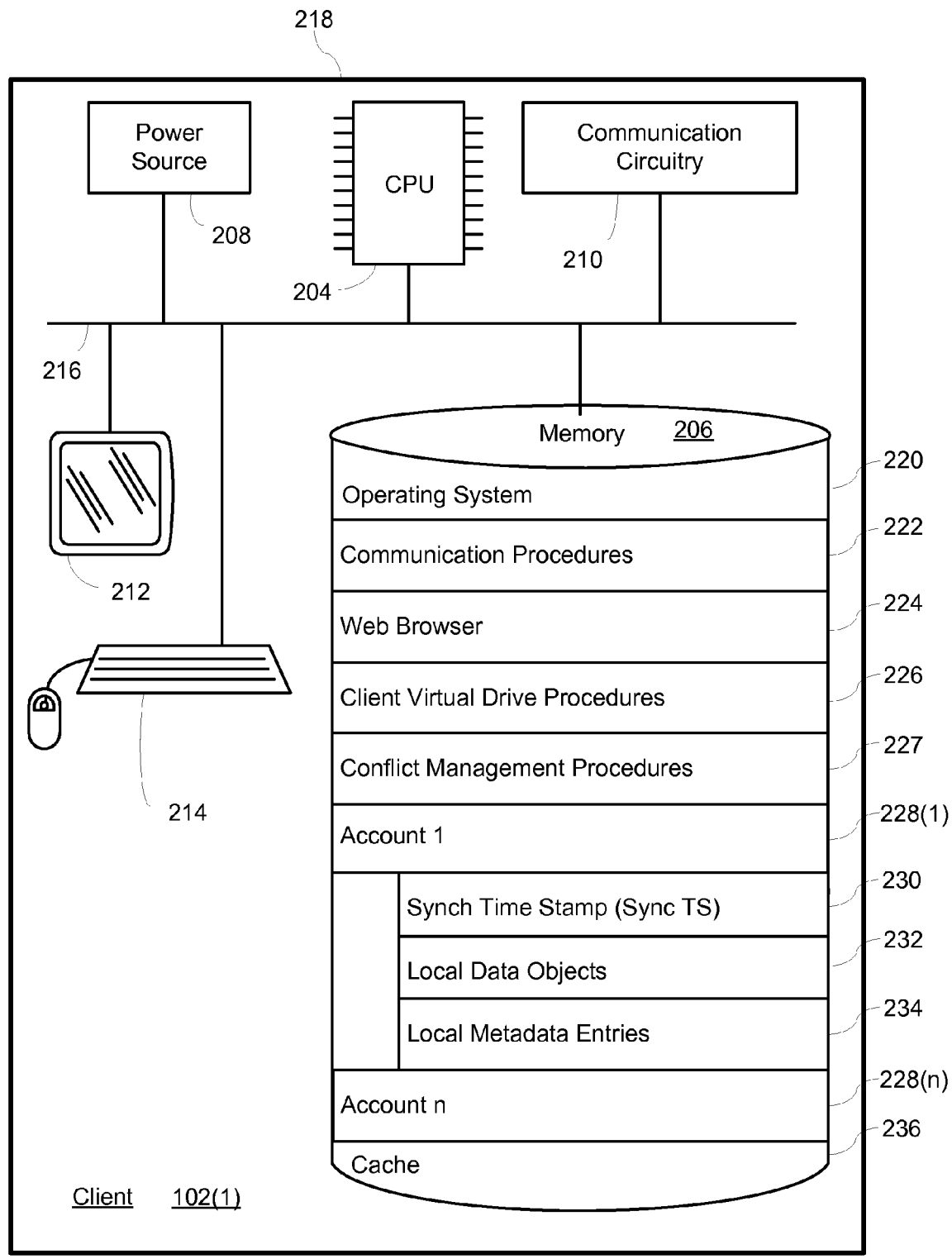
FIG. 2A is a block diagram of any one of the client computers shown in FIG. 1.

FIG. 2A is a block diagram of any one of the client computers 102(1)-(n) shown in FIG. 1. The client computer may contain various components, such as a processor, like a central processing unit (CPU) 204, a memory 206, a power source 208, communications circuitry 210, input and/or output devices, like a monitor 212 and a keyboard and mouse 214, and at least one bus 216 that connects the aforementioned components. In some embodiments, these components are at least partially housed within a housing 218.

The memory 206 (which may comprise or include a computer readable storage medium) preferably includes an operating system 220, such as LINUX, having instructions for processing, accessing, storing, or searching data, etc. The memory 206 also preferably includes communications procedures 222 for communicating with the network 104 (FIG. 1) and/or server 106 (FIG. 1); a web browser 224, such as Mozilla FIREFOX; client virtual drive procedures 226, the function of which is described below in relation to FIGS. 4A, 4B, 5A and 5B; conflict management procedures 327, the function of which is also described below in relation to FIGS. 4A-C and 5; one or more local user accounts 228(1)-(n); and a cache 232 for temporarily storing data.

In some embodiments, each user account 228 includes a synchronization time stamp (Sync TS) that provides an indication of when that account was last synchronized with the server 106 (FIG. 1). In some embodiments, each user account 228 also includes a number of local data objects 232, such as data files, and a number of local metadata entries 234. Each data object is associated with a single metadata file.

In some embodiments, the client virtual drive procedures 226 mount as part of the client computer's file system and handle at least some of the operating system's input and output calls. In an alternative embodiment, no virtual drive procedures 226 are present on the client computer, which handles all virtual drive instructions and communication through the Web Browser 224.

FIG. 2B is a schematic representation of a single metadata entry 250 on the client computer 102(1) shown in FIG. 2A. The metadata entry 250 includes an identifier 252 (sometimes called the data object identifier or file identifier) for the data object with which it is associated. The metadata entry 250 also includes various metadata fields 256-270 for the client, server, and prior fields for the server. In some embodiments, these various metadata fields 256-270 include a version number 256; the name 258 of the associated data object; an indication 260 of whether the metadata entry has been synchronized or not (synched or unsynched); a delete flag 262 indicating that the metadata entry should be deleted; a path 264 for the data object, such as "C:/GDRIVE/Presentation-.doc"; the size 266 of the data object; the permissions 268 associated with the data object, such as read, write, copy, print, and view permissions; and a checksum 270 of the data object. The use of some of these metadata fields is explained in further detail below.

Figure 3:
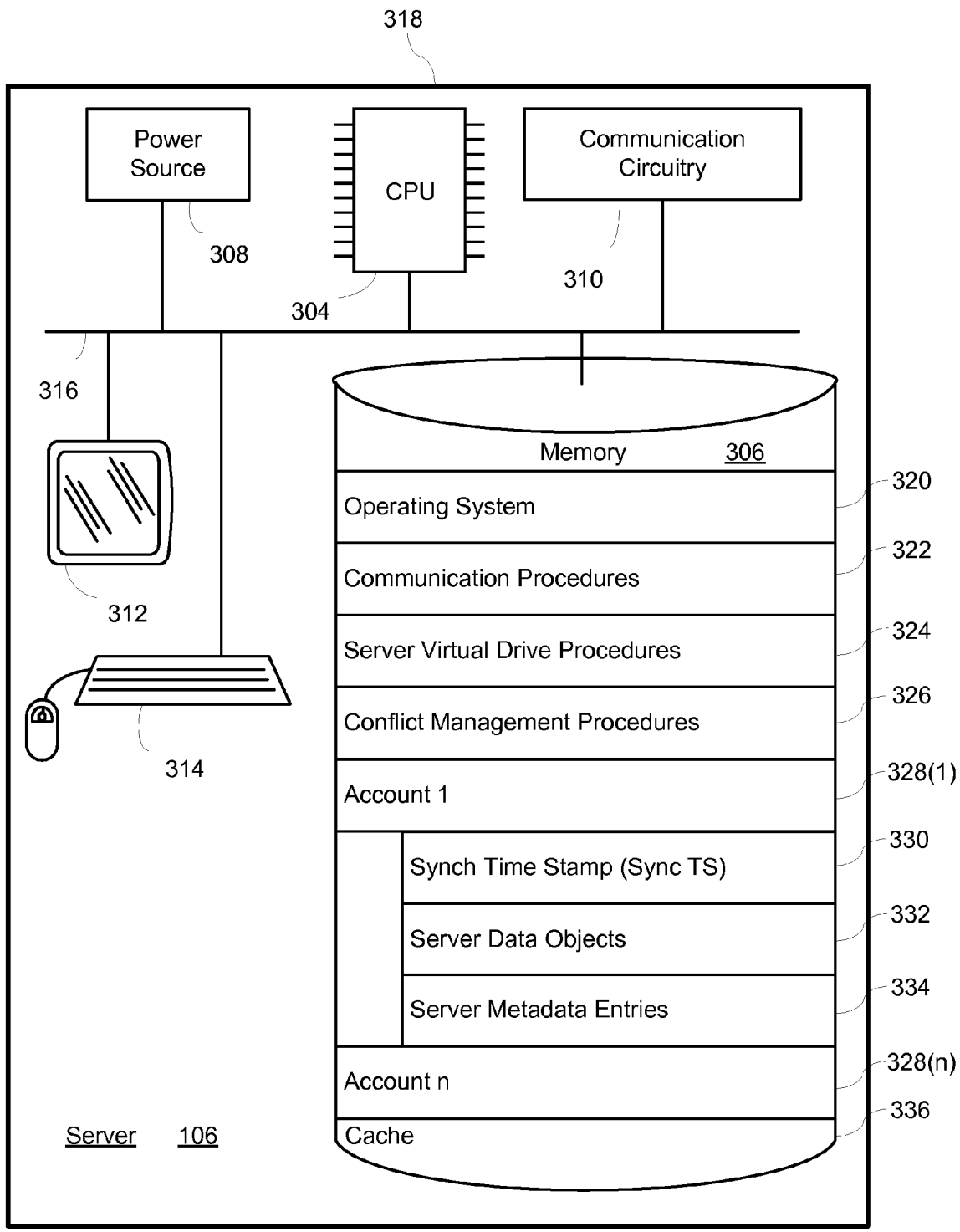
FIG. 3 is a block diagram of the server computer shown in FIG. 1.

FIG. 3 is a block diagram of the server computer 106 shown in FIG. 1. The server 106 may contain various components, such as a processor, like a central processing unit (CPU) 304, a memory 306, a power source 308, communications circuitry 310, input and/or output devices, like a monitor 312 and a keyboard and mouse 314, and at least one bus 316 that connects the aforementioned components. In some embodiments, these components are at least partially housed within a housing 318.

The memory 306 (which may comprise or include a computer readable storage medium) preferably includes an operating system 320, such as LINUX, having instructions for processing, accessing, storing, or searching data, etc. The memory 306 also preferably includes communications procedures 322 for communicating with the network 104 (FIG. 1), and/or client 102(1)-(n) (FIG. 1); server virtual drive procedures 324, the function of which is described below in relation to FIGS. 4A-C and 5; conflict management procedures 326, the function of which is also described below in relation to FIGS. 4A-C and 5; one or more user accounts 328(1)-(n); and a cache 332 for temporarily storing data.

In some embodiments, each user account 328 includes a synchronization time stamp (Sync TS) that provides an indication of when that account was last synchronized with the client 102 (FIG. 1). In some embodiments, each user account 328 also includes a number of server data objects 332, such as data files, and a number of server metadata entries 334. Each data object is associated with a single metadata file.

Metadata Synchronization Process

Overview

FIG. 6 is a flow diagram of an embodiment of a metadata synchronization process 600. A more detailed description of the metadata synchronization process is provided below with reference to FIGS. 4A, 4B and 4C. The metadata synchronization process may be performed separately for each share, or it may be performed for all shares to which a user has access rights. However, since different shares may be stored on different file servers, the following explanation is directed to synchronizing the metadata for a single share. The metadata synchronization process 600 is repeatedly performed periodically (e.g., once every N seconds, where N is in the range of 1 to 10) or episodically (e.g., in response to the occurrence of any one of a predefined set of trigger conditions). As explained in more detail below, some synchronization operations require more than one iteration of the metadata synchronization process 500 to be completed.

In a first phase (operations 602-608), sometimes called the commit phase, the client system sends to the server all client metadata entries (also sometimes called client meta-directory entries) that have been modified by the client (602). In some embodiments, client metadata entries that have been modified are marked with an IS_DIRTY flag. In some embodiments each field of each client and server metadata entry includes a flag (sometimes called the "modified flag") that is set whenever the content of the associated field is modified, and that is reset when the entry is synchronized with the corresponding client or server metadata entry. In some embodiments, the entire content of each changed metadata entry is sent to the server, while in other embodiments only changed fields of the entry are sent. The server receives the metadata entries from the client, identifies any received entries that conflict with entries in the server's corresponding meta-directory, and rejects the conflicting entries (i.e., the received entries that conflict with corresponding entries in the server's meta-directory) (604). A received client metadata entry conflicts with a server metadata entry when both entries have the same data object identifier, and both contain an updated value for the same metadata parameter that has been updated since the last server-client synchronization of these client and server metadata entries. For instance, if both entries (which have matching data object identifiers) have updated file sizes, or both entries has updated file names, then the two entries conflict and the server rejects the received client metadata entry. More generally, if both the client and server metadata entries have updated "parameter x" values, where "parameter x" is any parameter of these metadata entries, the two entries conflict and the server rejects the received client metadata entry. In some embodiments, rejected entries are not processed and thus their changed fields are not applied to the corresponding entries in the server's meta-directory. The remaining client metadata entries, which do not conflict with entries in the server's corresponding meta-directory, are accepted by the server and are used to update the server's meta-directory (604). For example, the updating may be performed in some embodiments by updating changed fields in existing metadata entries, assigning data object IDs to new meta entries and inserting the new metadata entries into the server's metadata table.

In some embodiments, the server assigns a version number to each new server metadata entry and assigns a new version number to each updated server metadata entry. Alternately, or in addition, it may store a timestamp in the server metadata entry to indicate the date and time of the last update made to the server metadata entry. The server metadata entries modified in response to the client metadata entries sent to the server are sent to the client (604). The client processes the received server metadata entries (606, 608). One aspect of this processing is identifying metadata entries that indicate revised file content located at the client, and scheduling content uploads of those files to the server (606). In some embodiments, the metadata entries include a content checksum field, and an update flag for that field that indicates whether the content checksum field contains an updated value. When the upload for a file is completed, the server changes its meta entry to clear the update flag, and that update is copied to the corresponding client metadata entry during a next iteration of the metadata synchronization process. Another aspect of processing the received server metadata entries is updating or overwriting the corresponding client metadata entries with the information in the received server meta entries (608). In summary, operations 602 through 608 synchronize updated client metadata entries with the corresponding server metadata entries, excluding client metadata entries that have updates that conflict with server metadata entries.

Next, in a second phase of the metadata synchronization process, sometimes called the get updates phase, the client requests from the server copies of all server metadata entries revised since the last metadata synchronization (610). As noted above, each metadata entry includes a timestamp (synch_ts) indicating the last time the entry was changed on the server. The server identifies and sends to the client the requested server metadata entries (612). For ease of explanation, separate discussions are provided for the handling of server metadata entries that do not conflict with client metadata entries and for the handling of those server metadata entries that do conflict with client metadata entries. It may be noted that the server metadata entries sent to the client at 612 may include server metadata entries corresponding to any client metadata entries rejected by the server at 604 due to conflicting updates.

When a received server metadata entry does not conflict with any corresponding client metadata entries (i.e., entries having the same filed ID and/or the same filename), the metadata changes in the server metadata entry are applied to the corresponding client metadata entry (614). Alternately, the received server metadata entry is used to overwrite the corresponding client metadata entry, if any. When there is no corresponding client metadata entry, a new client metadata entry is generated. In addition, if the server metadata entry indicates revised file content located at the server, the client schedules a content download of the files from the server (614).

When a received server metadata entry conflicts with one or more corresponding client metadata entries (i.e., entries having the same filed ID and/or the same filename), the process requires a user to resolve the conflict (616). As noted above, the user may resolve the conflict by selecting a client or server version of a file (and its metadata) as the "winner," in which case the losing file and/or its metadata will be overwritten by the winning file and/or its metadata, or the user may rename or move the conflicting client file so as to eliminate the conflict. Changes are applied to the client meta-directory in accordance with the user specified resolution of the conflict (616). This may include deleting or revising one or more client metadata entries. In addition, the client schedules any file content uploads or downloads needed to implement the user specified resolution of the conflict (616). For instance, when the server metadata entry is selected by the user as the winning entry, and that entry includes an update flag or other data that indicates that the content of the corresponding server file is new or updated, a file download is scheduled. More generally, if the server metadata entry survives the conflict resolution process and includes an update flag or other data that indicates that the content of the corresponding server file is new or updated, a file download is scheduled. On the other hand, if the conflict resolution process results in a client metadata entry that includes an update flag or other data that indicates that the content of the corresponding client file is new or updated, a file upload will be scheduled during the next metadata synchronization cycle (i.e., when operations 602-606 are next performed). The scheduling and execution of file uploads and downloads is discussed in more detail in a related patent application, U.S. patent application Ser. No. 11/323,199, filed Dec. 30, 2005, entitled "Locally Cached File System."

If a new or updated a client metadata entry includes a file path that requires changes to the directory structure of the meta-directory, then appropriate directory or folder entries are created, revised or deleted to reflect the revised directory structure. Similarly, if a file is moved from one directory or folder to another, those changes are reflected in the corresponding metadata entries, and all such changes in the client meta-directory are replicated in the server meta-directory during the next metadata synchronization cycle.

Metadata Synchronization Process

Detailed Discussion

Figure 4A:
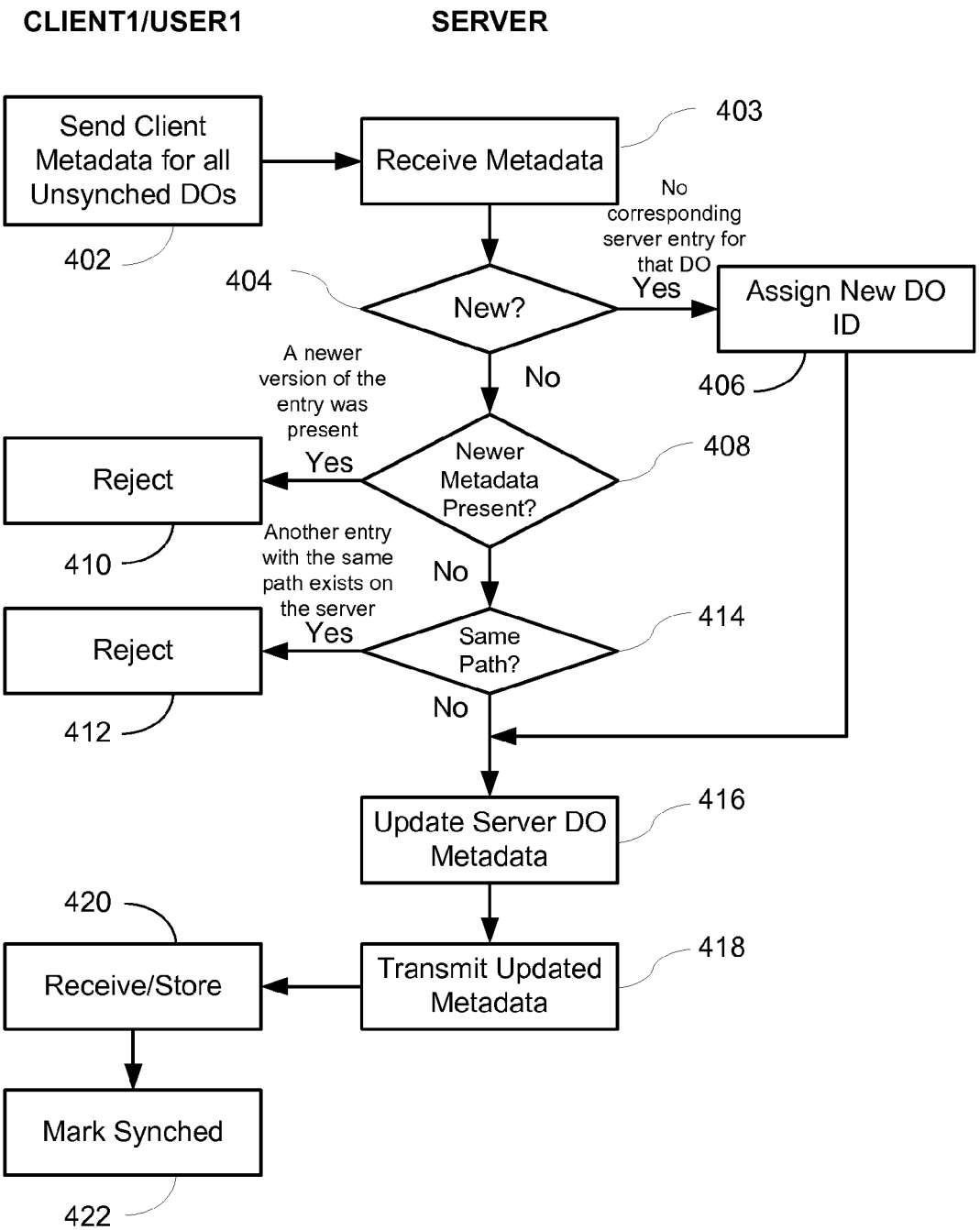
FIG. 4A is a flow chart of a commit phase of a metadata synchronization process, according to an embodiment of the invention.

FIG. 4A is a flow chart of a commit phase 400 of a metadata synchronization process 600, according to an embodiment of the invention. In some embodiments, the operations performed by the client in the commit phase 400 are performed by the virtual drive procedures 226 (FIG. 2A) and/or the conflict management procedures 227 (FIG. 2A). Similarly, the operations performed by the server in the commit phase 400 are performed by the virtual drive procedures 324 (FIG. 3) and/or the conflict management procedures 326 (FIG. 3) on the server.

As soon as a change is made to any data object or metadata on the client computer or "client" 102 (FIG. 1), the client sends the server 106 (FIG. 1) all unsynchronized metadata entries (402), i.e., all of the metadata entries with the field 260 (FIG. 2B) that is marked as unsynched. Alternatively, the client sends all unsynchronized metadata entries to the server periodically, such as every 5 minutes. It is axiomatic that the client will not send these unsynchronized metadata entries to the server unless the client is connected to the server via the network 104 (FIG. 1). The server then receives all of the unsynchronized metadata entries from the client (403). For ease of explanation, only a single metadata entry will be described. However, it should be appreciated that many different metadata entries are communicated between the client and the server.

The server then determines whether the metadata entry is new (404), i.e., does the account on the server include a metadata entry with the same data object identifier 252 (FIG. 2B). If the metadata entry is new (404—Yes), then the server assigns a new data object identifier 252 (FIG. 2B) to the new metadata entry (406), and updates the server metadata entries 334 (at 416), with the new metadata entry received from the client. If, however, the metadata entry is not new (404—No), then the server determines if a newer version of the metadata entry is present on the server (408).

If newer metadata is present on the server (408—Yes), then the server rejects the metadata entry received from the client (410). In addition to checking for newer metadata, the server determines, at 414, if another data object exists on the server with the same path. This determination is undertaken by examining the path fields 264 (FIG. 2B) in the two compared metadata entries. If another data object exists on the server with the same path (414—Yes), then the server rejects the metadata entry received from the client at 412. However, if new metadata is not present on the server (408—No) and another data object does not exist on the server with the same path (414—No), then the server updates the server metadata entries 334, at 416, with the new metadata entry received from the client.

Optionally, when the server rejects a metadata entry from the client, the rejection may include a rejection message that is transmitted to the client from the server. However, as described below, rejected metadata entries from the client are either automatically overwritten or cause a conflict resolution request to be sent to the user during the "get updates" phase of the metadata synchronization process. As a result, in some embodiments rejected metadata entries do not cause a rejection message to be sent to the client.

The updated metadata entry on the server is then transmitted back to the client at 418. The client receives and stores the updated metadata entry at 420, and marks the metadata entry synched/unsynched field 260 (FIG. 2B) as synchronized or synched at 422. In some embodiments, the updated metadata entry is assigned a new version number by the server prior to the metadata entry being sent back to the client at 418, thereby ensuring that both client and server have the same, latest version of the metadata entry. Other fields of the metadata entry, such a synchronization timestamp, may also be updated by the server during this process.

The above described commit phase 400 of the metadata synchronization process ensures that new or newer data objects, and their associated metadata, created on the client are uploaded to the server. Any potential conflicts are rejected and dealt with during the get updates phase 430 described below.

Figure 4B:
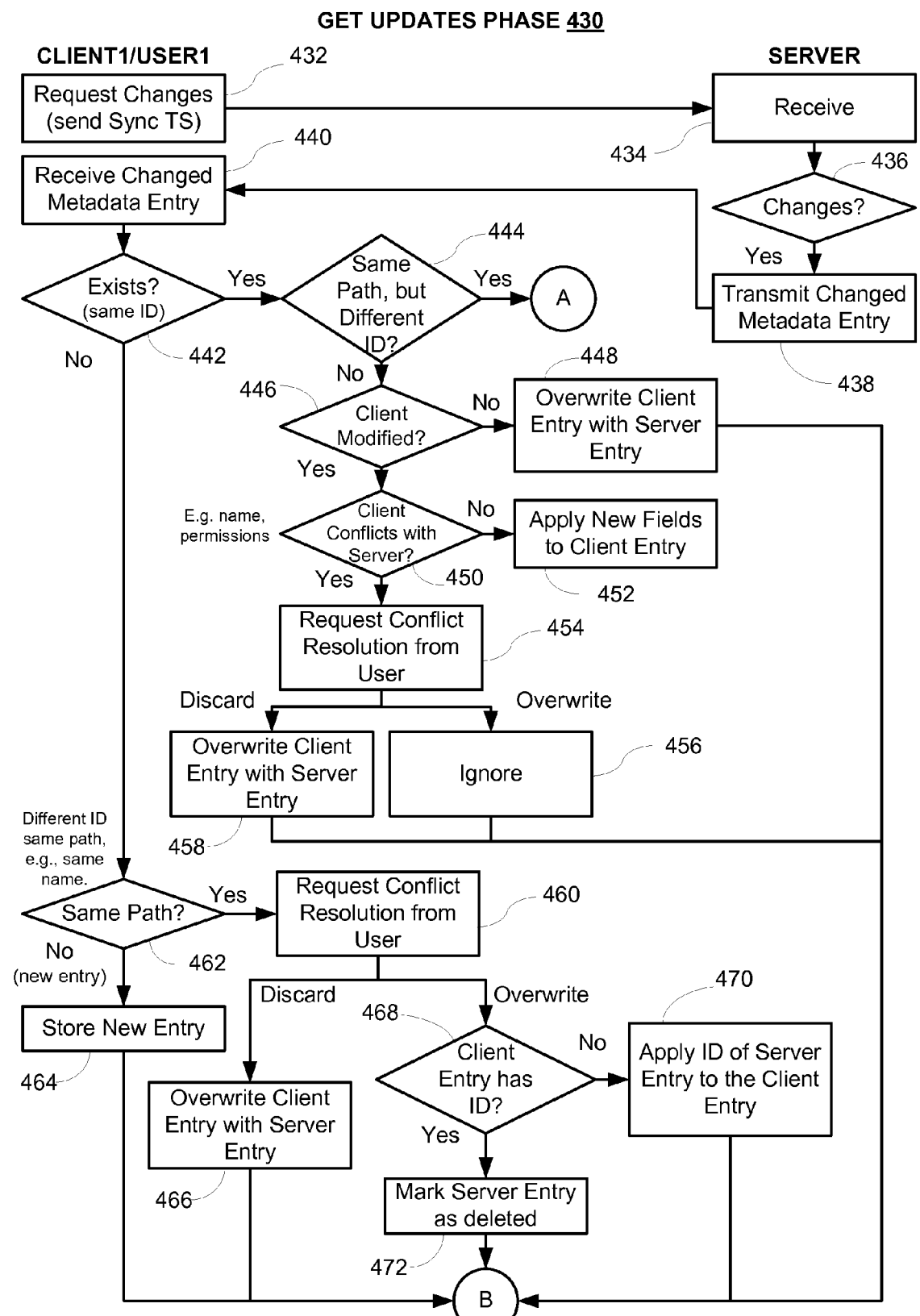
FIGS. 4B and 4C are a flow chart of a get updates phase of the metadata synchronization process, which includes a conflict management process, according to an embodiment of the invention.
Figure 4C:
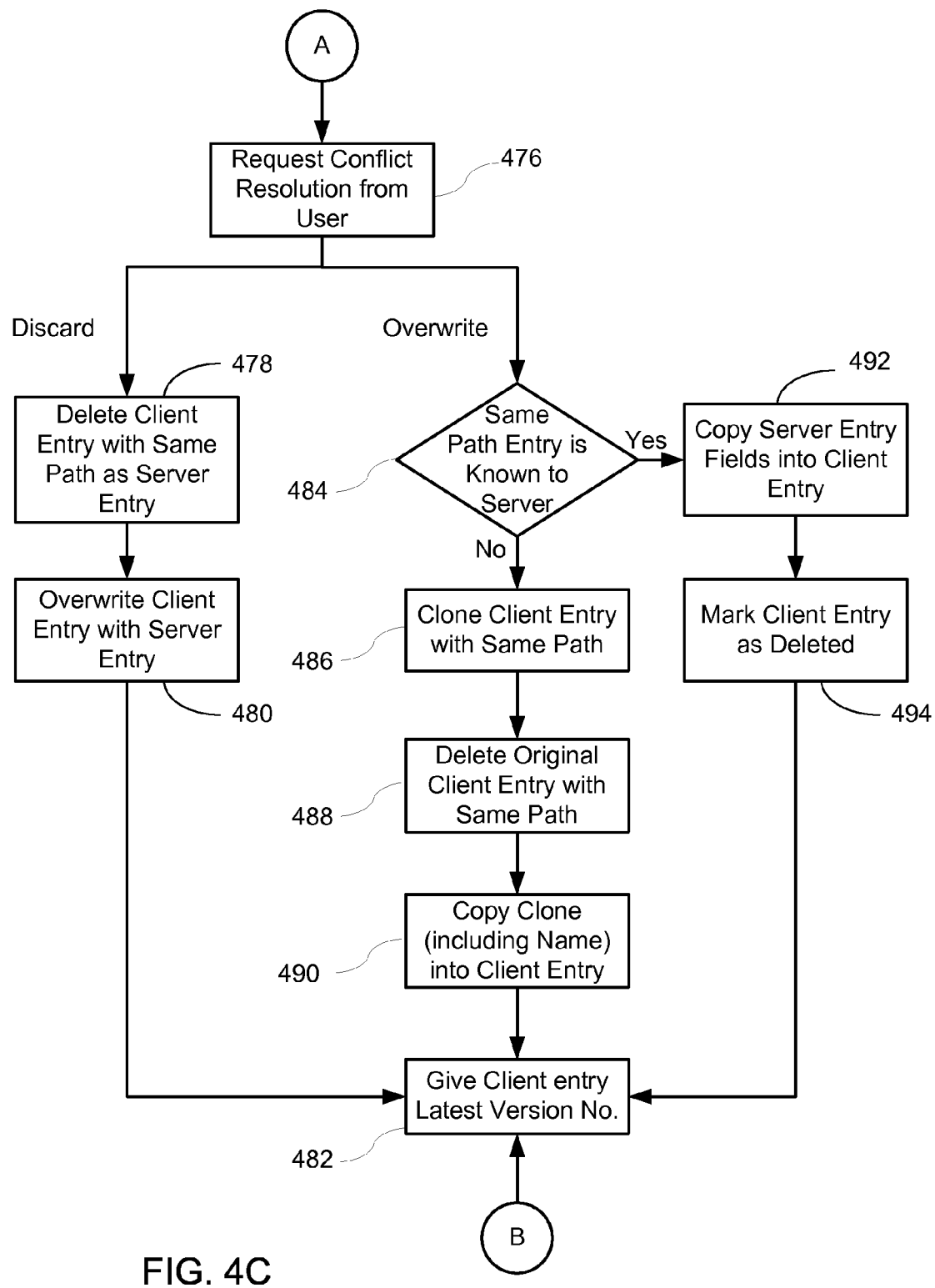

FIGS. 4B and 4C are a flow chart of a get updates phase 430 of the metadata synchronization process 600. In some embodiments, the operations performed by the client in the get updates phase 430 are performed by the virtual drive procedures 226 (FIG. 2A) and/or the conflict management procedures 227 (FIG. 2A). Similarly, the operations performed by the server in the get updates phase 430 are performed by the virtual drive procedures 324 (FIG. 3) and/or the conflict management procedures 326 (FIG. 3).

In some embodiments, the get updates phase 430 of the metadata synchronization process is performed after each execution of the commit phase 400. Alternately, the get updates phase 430 may be executed either periodically, or episodically in response to a trigger condition (e.g., connection to the server, or a client request for a data object from the server). The client transmits a request to the server requesting any changes to the metadata on the server, at 432. The request includes an indication of when the last synchronization occurred between the server and the client. In some embodiments, this indication may be the synchronization time stamp (synch TS) 230 (FIG. 2A). The request is then received by the server (434).

The servers then determine whether any changes to any of the data objects or metadata have been made since the last time that the server synchronized with the client. This may be determined by comparing the modification dates of any of the data objects (or associated metadata entries) with the synchronization time stamp (synch TS) received from the client. If no changes have been made on the server (436—No), the server either ignores the request for changes or transmits a message back to the client that no changes were made (not shown). However, if changes have been made on the server (436—Yes), then the server transmits the changed metadata entry to the client (438).

The client receives the changed metadata entry from the server, at 440, and the client then determines, at 442, whether the metadata entry received from the server already exists on the client, i.e., whether a metadata entry (and associated data object) having the same data object identifier 252 (FIG. 2B) already exists on the client.

If the metadata entry received from the server does not already exist on the client (442—No), i.e., a new data object exists at the server, then the client determines from the metadata, at 462, whether a different data object exists on the client with the same path as the data object associated with the metadata entry received from the server. If no other data object exists on the client that has the same path as the data object associated with the metadata entry received from the server (462—No), i.e., the new metadata entry received from the server does not conflict with another metadata entry on the client, then the new metadata entry is stored on the client at step 464. The new metadata entry stored on the client includes the latest version number 256 (FIG. 2B) for that metadata entry at 482 (FIG. 4C).

If, however, another data object exists on the client that has the same path as the data object associated with the metadata entry received from the server (462—Yes), then the client requests a conflict resolution from the user at 460. An example of a conflict resolution graphical user interface (GUI) is shown and described below in relation to FIG. 5.

Although other options may exist, at least the following choices are given to the user: (i) discard the client data object and its metadata entry, i.e., the server metadata entry trumps the client metadata entry, or (ii) overwrite the server data object with the client data object, i.e., the client metadata entry trumps the server metadata entry. If the user chooses to discard the client data object, the client metadata entry is overwritten by the server metadata entry at 466. The new metadata entry stored on the client is then given the latest version number 256 (FIG. 2B) for that metadata entry at step 482 (FIG. 4C).

If the user chooses to overwrite the server data object, the client determines, at 468, whether the metadata entry on the client has a data object identifier 252 (FIG. 2B). The only time that a metadata entry on the client (with a data object having the same path as the data object associated with the metadata received from the server) will not have a data object identifier 252 (FIG. 2B) is if a new data object has been created on the client, but has not yet been assigned an identifier from the server.

If the client metadata entry does not have a data object identifier (468—No), the client applies the identifier of the server metadata entry to the client metadata entry at 470. If the metadata entry on the client has a data object identifier (468—Yes), then the server metadata entry is marked for deletion (i.e., the server metadata entry is marked in the client as deleted, which will cause it to be deleted during execution of the next commit phase 400) and is stored as a new metadata entry in the client (472). Furthermore, the new metadata entry stored on the client is given the latest version number 256 (FIG. 2B) for that metadata entry (482, FIG. 4C).

In some embodiments, in response to a request for conflict resolution (460 or 454 or 576), the user may rename or move a conflicting client file so as to eliminate the conflict. In some embodiments, when a client file is renamed or moved in response to a request for conflict resolution, the processing of the received server metadata entry restarts at 442.

Returning to reference numeral 442, if the client has a client metadata entry that has the same data object identifier as the server metadata entry (received from the server) (442—Yes), then the client determines, at 444, whether client also has a second client metadata entry (a "same path entry") associated with a data object that has the same path as the server entry, but a different data object identifier than the server entry. If the client does not have a second client metadata entry with the same path as the received server entry, but a different data object identifier, (444—No), then the client determines, at 446, whether the data object on the client (i.e., the client data object having the matching data object identifier) has been modified. This may be determined by comparing the client and server metadata entries. If the data object on the client has not been modified, i.e., only the data object on the server was changed while the data object on the client was not, (446—No), then the client metadata entry is overwritten with the metadata entry received from the server (448). The metadata entry stored on the client is given the latest version number 256 (FIG. 2B) for that metadata entry (482, FIG. 4C).

However, if the data object on the client has been modified, i.e., the data object on the client and server were both changed, (446—Yes), then the client determines whether a conflict exists between the data objects (or associated metadata) on the client and server (450). For example, the server metadata entry may have changed the permissions for the data object while the client metadata entry may have changed the data object's name, which will not result in a conflict between the metadata entries as both changes can be implemented without a conflict. Therefore, if no conflict exists (450—No), the non-conflicting changes from the server metadata entry are applied to the client metadata entry (452).

If however, a conflict does exist (450—Yes), then the client requests a conflict resolution from the user at 454. An example of a conflict resolution graphical user interface is shown and described below in relation to FIG. 5.

As described above, at least the following two choices are given to the user (i) discard the client data object and its metadata entry, i.e., the server metadata entry trumps the client metadata entry, or (ii) overwrite the server data object with the client data object, i.e., the client metadata entry trumps the server metadata entry. If the user chooses to discard the client data object, the client metadata entry is overwritten by the server metadata entry at 458. If the user chooses to overwrite the server data object with the client data object, then the server metadata entry is ignored at 456. The client metadata entry is then given the latest version number 256 (FIG. 2B) of the server metadata entry at 482 (FIG. 4C), which will cause the client metadata entry to overwrite the server metadata entry in the server during the next execution of the commit phase 400.

Returning to reference numeral 444. If there is a second client metadata entry (called a "same path entry") that is associated with a second data object that has the same path, but a different data object identifier, as the data object associated with the received server metadata entry (444—Yes), then the client requests a conflict resolution from the user at 476 (FIG. 4C). An example of a conflict resolution graphical user interface is shown and described below in relation to FIG. 5.

As described above, the conflict resolution GUI provides at least two choices to the user, namely (i) to discard the client data objects (i.e., both the first client data object corresponding to the object identifier of the received server metadata entry, and the second client object having the same path and the received server metadata entry), i.e., the server metadata entry trumps the client metadata entries, or (ii) to overwrite the server data object with the "same path" client data object, i.e., the client metadata entry for the "same path file" trumps the server metadata entry.

If the user chooses at 476 to discard the client data object, the client metadata entry with the same path as the server metadata entry is marked as deleted on the client (i.e., the client metadata entry is marked as deleted) (478), and the client metadata entry (with the same data object identifier as the server metadata entry) is overwritten with the server metadata entry (480). For example, consider the situation in which two files exist on the client, the first with an identifier 2 and a path of C, and the second with an identifier 3 (data object ID 3) and a path D, while the server metadata entry has a data object identifier of 2 and a path of D. Then, a client metadata entry (called the "same ID entry") with the same data object identifier (2) exists on the client (442—Yes), and a client metadata entry (called the "same path entry") with the same path (D) but a different identifier (3) (444—Yes) also exists on the client. Therefore, if the user selects to discard the client data object (and associated metadata entry), then the "same path entry" (the client metadata entry with an identifier of 3 and a path of D) is deleted (step 478) and the "same ID entry" (the client metadata entry with an identifier of 2 and a path of C) is overwritten by the server metadata entry with an identifier of 2 and a path of D. The resulting metadata entry stored on the client is then given the latest version number 256 (FIG. 2B) for that metadata entry at step 482.

However, if the user chooses (at 476) to overwrite the server data object with the "same path" client data object, both the client and server files corresponding to the data object identifier of the received server metadata entry are deleted. Only the same path file survives. At 484, the client determines whether the client data object (herein called the "same path client file") having the same path as the received server metadata entry is known to the server. In other words, has the same path client file ever been synchronized with the server. In our example, the client determines at 484 whether there a server metadata entry with data object identifier 3. If not, the same path client file is effectively a new client file that has not yet been assigned a data object identifier and version number.

Continuing with the above example, the client inspects the client metadata entry for the same path client file to determine if it has ever been synchronized with the server (484). For example, the client metadata entry for the same path client file may have a synchronization timestamp that is unequal to a default or null value, thereby indicating a prior synchronization with the server. If so (484—Yes), the fields of the received server metadata entry (i.e., with path D and ID 2, in our example) are copied into the "same ID entry" (i.e., the client metadata entry having the same data object identifier as the server metadata entry) at 492. The modified client metadata entry (i.e., the "same ID entry") is then marked as deleted at 494, i.e., the deleted flag field 262 (FIG. 2B) is set and this same client metadata entry is given the latest version number 256 (FIG. 2B) for that metadata entry at 482. As a result, the client metadata entry will overwrite the server metadata entry when the next commit phase is executed, and the corresponding client and server files will be deleted. Also, the "same path" client file (file 3, path D) will be retained at the client, and copied to the server if the server does not already have the current version of that file. In an alternate embodiment, the server metadata entry may be marked as deleted, and then copied into the "same ID entry" at 492, 494.

However, if the "same path entry" has not ever been synchronized with the server (484—No), several operations (486-490) are performed so that the same path file in the client takes over or hijacks the client metadata entry whose data object identifier matches the data object identifier in the receiver server metadata entry. In some embodiments, the client makes a new metadata entry that is a copy or clone of the same path entry (i.e., the client metadata entry with the same path as the received server metadata entry) (486). The original client metadata entry with the same path is marked as deleted at 488. The new or cloned metadata entry (including the name of the same path data object) is then copied into the client metadata entry (i.e., the "same ID entry") at 490, while leaving the data object identifier and synchronization information in the client metadata entry unchanged. Finally, the client metadata entry (i.e., the "same ID entry") is given the latest version number 256 (FIG. 2B) of the received server metadata entry at 482. The metadata entry that has been marked as deleted will cause the client file having the same data object identifier as the received server metadata entry to be deleted. The hijacked client metadata entry will overwrite the server metadata entry when the next commit phase is executed, thereby causing the same path client file (e.g., the client file with path D in our example) to overwrite the corresponding server file after the next commit phase (see 616, FIG. 6).

Figure 5:
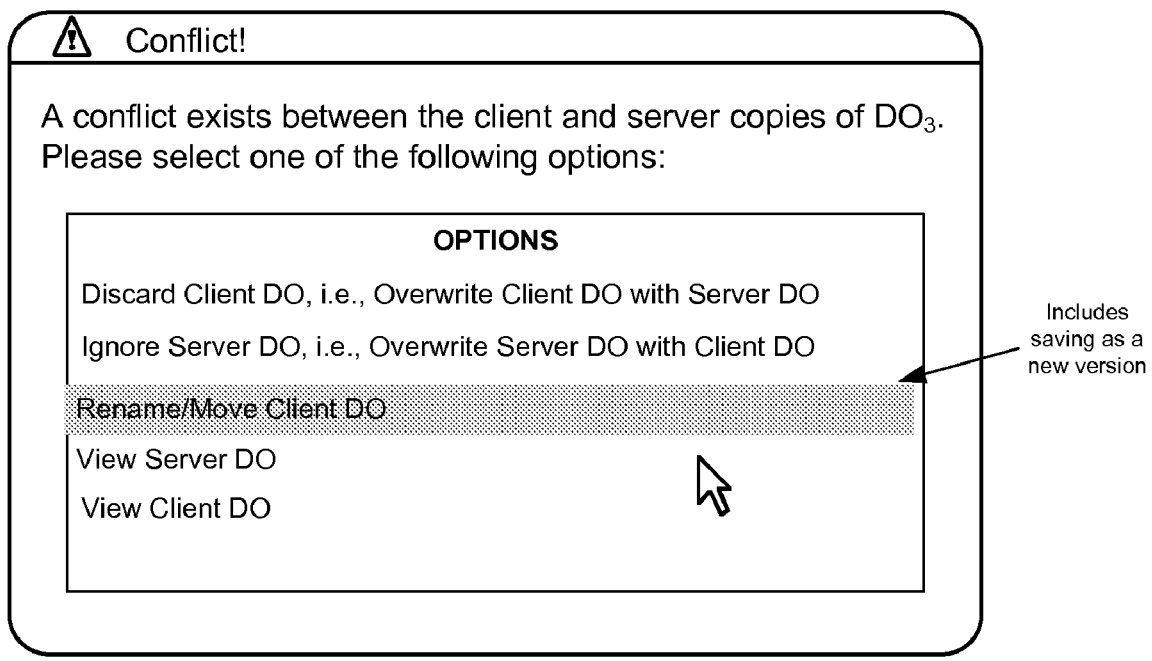
FIG. 5 is a user interface screenshot presented to a user during the conflict management process of the metadata synchronization process, according to one embodiment of the invention.

FIG. 5 is a user interface screenshot that is displayed to a user to request conflict resolution. As can be see from this screenshot, the client computer presents the user with a number of conflict management and resolution options, including (i) discarding the client data object, i.e., overwriting the client data object with the server data object; (ii) ignoring the server data object, i.e., overwriting the server data object with the client data object; (iii) renaming or moving the client data object; (iv) viewing the server object; and (v) viewing the client object. In some embodiments, the user may be given the option of renaming or moving the server data object so as to resolve the conflict.

As described in related U.S. patent application Ser. No. 11/323,199, filed Dec. 30, 2005, entitled "Locally Cached File System," files and other data objects are copied from server to client, or vice versa, in accordance with changes in the synchronized client and server metadata entries. The copying of files and other data objects may be accomplished using a background process so as to avoid disrupting other operations being performed by the client computer.

While the foregoing description and drawings represent the preferred embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. The presently disclosed embodiments are therefore to be considered in all respects as illustrative and not restrictive, the scope of the invention being indicated by the appended claims, and not limited to the foregoing description.

What is claimed is:

1. A computer implemented method for synchronizing data objects stored on a server and a client, comprising:
   at the server, storing server metadata entries corresponding to a plurality of data objects, wherein each server metadata entry associates both an identifier and a server file name, distinct from the identifier, with a respective data object stored on the server, the server file name including a directory path;
   at the server:
      during a first phase of a synchronization process, receiving one or more client metadata entries from the client, each of the client metadata entries corresponding to a data object stored on the client for which at least one metadata parameter has changed since a prior execution of the synchronization process, wherein each client metadata entry associates both an identifier and a client file name, distinct from the identifier, with a respective data object stored on the client, the client file name including a directory path;
      during the first phase of the synchronization process, rejecting any received client metadata entry that contains one or more updated metadata parameters that conflict with metadata parameters of a corresponding server metadata entry, and accepting any received client metadata entry that does not conflict with a corresponding server metadata entry, wherein a server metadata entry corresponds to a received client metadata entry when the received client metadata entry contains a same identifier as the server metadata entry without regard to whether the server file name and client file name of the server metadata entry and client metadata entry match;

during the first phase of the synchronization process, accepting any received client metadata entry for which the server does not have a corresponding server metadata entry; and during a second phase of the synchronization process, sending to the client one or more server metadata entries, each of the server metadata entries corresponding to a data object stored on the server for which at least one metadata parameter has changed since a prior execution of the synchronization process; wherein, when a client metadata entry has been rejected at the server during the first phase, the one or more server metadata entries sent to the client include at least one server metadata entry that conflicts with the rejected client metadata entry.

2. The method of claim 1, including, at the server, during the first phase of the synchronization process, rejecting any received client metadata entry that specifies a file path for a respective data object stored on the client that matches the file path specified in a server metadata entry having a different identifier than the received client metadata entry.

3. The method of claim 1, including, at the server, during a subsequent phase of the synchronization process, performing a content update operation comprising at least one of a content upload operation and a content download operation.

4. The method of claim 3, wherein the content upload operation comprises uploading to the client one or more server content updates, each of the server content updates corresponding to a data object stored on the server for which at least one content parameter has changed since a prior execution of the synchronization process; wherein the one or more server content updates uploaded to the client are associated with the one or more server metadata entries sent to the client during the second phase of the synchronization process.

5. The method of claim 3, wherein the content download operation comprises downloading from the client one or more client content updates, each of the client content updates corresponding to a data object stored on the client for which at least one content parameter has changed since a prior execution of the synchronization process; wherein the one or more client content updates downloaded from the client are associated with the one or more client metadata entries received from the client during the first phase of the synchronization process.

6. The method of claim 1, wherein the server receives the one or more client metadata entries from the client via a wide area network.

7. The method of claim 1, wherein the server metadata entries stored at the server include a server metadata entry for a respective data object, said server metadata entry comprising data selected from a group consisting of a data object identifier, an identifier of a parent of said data object, a version number, a data object name, a size of said data object, a size of said data object when encrypted, a checksum, a date and time when said data object was last modified, a date and time when said data object was created, attributes of said data object, flags related to said data object, an indicator of whether said data object is available locally, an indicator of whether said server has data for said data object, and a timestamp of when said data object was last changed on said server.

8. A computer implemented method for synchronizing data objects stored on a server and a client, comprising:

at the client, storing client metadata entries corresponding to a plurality of data objects, wherein each client metadata entry associates both an identifier and a client file name, distinct from the identifier, with a respective data object stored on the client, the client file name including a directory path;

at the client:

during a first phase of a synchronization process, sending one or more client metadata entries to the server, each of the client metadata entries corresponding to a data object stored on the client for which at least one metadata parameter has changed since a prior execution of the synchronization process;

during a second phase of the synchronization process, receiving from the server one or more server metadata entries, each of the server metadata entries corresponding to a data object stored on the server for which at least one metadata parameter has changed in the server metadata entry since a prior execution of the synchronization process, wherein each server metadata entry associates both an identifier and a server file name, distinct from the identifier, with a respective data object stored on the server, the server file name including a directory path; wherein, when a client metadata entry has been rejected at the server during the first phase, the one or more server metadata entries sent to the client include at least one server metadata entry that conflicts with rejected client metadata entry;

during the second phase of the synchronization process, accepting any received server metadata entry for which the client does not have a corresponding client metadata entry;

during the second phase of the synchronization process, identifying any received server metadata entry that contains one or more updated metadata parameters that conflict with metadata parameters of a corresponding client metadata entry, requesting a user to select from among a predefined set of conflict resolutions to resolve the conflict, performing an action in accordance with the conflict resolution selected by the user, and accepting any received server metadata entry that does not conflict with a corresponding server metadata entry, wherein a client metadata entry corresponds to a received server metadata entry when the received server metadata entry contains a same identifier as the client metadata entry without regard to whether the server file name and client file name of the server metadata entry and client metadata entry match.

9. The method of claim 8, wherein performing an action in accordance with the conflict resolution selected by the user comprises updating one or more client metadata entries in accordance with the user selected conflict resolution.

10. The method of claim 8, including, at the client, during the second phase of the synchronization process, responding to any received server metadata entry that specifies a file path for a respective data object stored on the server that matches the file path specified in a client metadata entry having a different identifier than the received server metadata entry by requesting a user to select from among the predefined set of conflict resolutions to resolve the conflict, and updating one or more client metadata entries in accordance with the user selected conflict resolution.

11. The method of claim 8, including, at the client, during a subsequent phase of the synchronization process, performing a content update operation comprising at least one of a content upload operation and a content download operation.

12. The method of claim 11, wherein the content upload operation comprises uploading to the server one or more client content updates, each of the client content updates corresponding to a data object stored on the client for which at least one content parameter has changed since a prior execution of the synchronization process; wherein the one or more client content updates uploaded to the server are associated with the one or more client metadata entries sent to the server during the first phase of the synchronization process.

13. The method of claim 11, wherein the content download operation comprises downloading from the server one or more server content updates, each of the server content updates corresponding to a data object stored on the server for which at least one content parameter has changed since a prior execution of the synchronization process; wherein the one or more server content updates downloaded from the server are associated with the one or more server metadata entries received from the server during the second phase of the synchronization process.

14. The method of claim 8, wherein the client receives the one or more server metadata entries from the server via a wide area network.

15. The method of claim 8, wherein the server metadata entries stored at the server include a server metadata entry for a respective data object, said server metadata entry comprising data selected from a group consisting of: a data object identifier, an identifier of a parent of said data object, a version number, a data object name, a size of said data object, a size of said data object when encrypted, a checksum, a date and time when said data object was last modified, a date and time when said data object was created, attributes of said data object, flags related to said data object, an indicator of whether said data object is available locally, an indicator of whether said server has data for said data object, and a timestamp of when said data object was last changed on said server.

16. The method of claim 8, wherein performing an action in accordance with the conflict resolution selected by the user comprises performing an action selected from a group consisting of: modifying a client metadata entry so as to discard a corresponding data object stored on the client, modifying a client metadata entry so as to overwrite a corresponding data object stored on the server with a client data object identified by the client metadata entry, renaming a data object stored on the client, moving a data object stored on the client, and copying a data object stored on the client.

17. A non-transitory computer readable storage medium storing one or more programs for execution by one or more processors of a server system, the one or more programs comprising instructions for:

storing, at the server system, server metadata entries corresponding to a plurality of data objects stored on the server system, wherein each server metadata entry associates both an identifier and a server file name, distinct from the identifier, with a respective data object stored on the server system, the server file name including a directory path;

during a first phase of a synchronization process, receiving, at the server system, one or more client metadata entries from a client system, each of the client metadata entries corresponding to a data object stored on the client system for which at least one metadata parameter has changed since a prior execution of the synchronization process, wherein each client metadata entry associates both an identifier and a client file name, distinct from the identifier, with a respective data object stored on the client system, the client file name including a directory path;

during the first phase of the synchronization process, at the server system, rejecting any received client metadata entry that contains one or more updated metadata parameters that conflicts with metadata parameters of a corresponding server metadata entry, and accepting any received client metadata entry that does not conflict with a corresponding server metadata entry, wherein a server metadata entry corresponds to a received client metadata entry when the received client metadata entry contains a same identifier as the server metadata entry without regard to whether the server file name and client file name of the server metadata entry and client metadata entry match;

during the first phase of the synchronization process, accepting any received client metadata entry for which the server system does not have a corresponding server metadata entry; and during a second phase of the synchronization process, at the server system, sending to the client system one or more server metadata entries, each of the server metadata entries corresponding to a data object stored on the server system for which at least one metadata parameter has changed since a prior execution of the synchronization process; wherein, when a client metadata entry has been rejected at the server system during the first phase, the one or more server metadata entries sent to the client system include at least one server metadata entry that conflicts with rejected client metadata entry.

18. A non-transitory computer readable storage medium storing one or more programs for execution by one or more processors of a client system, the one or more program comprising instructions for:

storing, at the client system, client metadata entries corresponding to a plurality of data objects stored on the client system, wherein each client metadata entry associates both an identifier and a client file name, distinct from the identifier, with a respective data object stored on the client system, the client file name including a directory path;

during a first phase of a synchronization process, sending, from the client system, one or more client metadata entries to a server system, each of the client metadata entries corresponding to a data object stored on the client system for which at least one metadata parameter has changed since a prior execution of the synchronization process;

during a second phase of the synchronization process, receiving at the client system from the server system one or more server metadata entries, each of the server metadata entries corresponding to a data object stored on the server system for which at least one metadata parameter has changed in the server metadata entry since a prior execution of the synchronization process, wherein each server metadata entry associates both an identifier and a server file name, distinct from the identifier, with a respective data object stored on the server system, the server file name including a directory path; wherein, when a client metadata entry has been rejected at the server system during the first phase, the one or more server metadata entries sent to the client system include at least one server metadata entry that conflicts with rejected client metadata entry;

during the second phase of the synchronization process, accepting any received server metadata entry for which the client system does not have a corresponding client metadata entry; and during the second phase of the synchronization process, at the client system, identifying any received server metadata entry that contains one or more updated metadata parameters that conflicts with metadata parameters of a corresponding client metadata entry, requesting a user to select from among a predefined set of conflict resolutions to resolve the conflict, performing an action in accordance with the conflict resolution selected by the user, and accepting any received server metadata entry that does not conflict with a corresponding client metadata entry, wherein a client metadata entry corresponds to a received server metadata entry when the received server metadata entry contains a same identifier as the client metadata entry without regard to whether the server file name and client file name of the server metadata entry and client metadata entry match.

19. A data objects synchronization system, comprising:
one or more processors;
memory; and
one or more programs stored in the memory, the one or more programs comprising:
instructions to store, at a server system, server metadata entries corresponding to a plurality of data objects stored on the server system, wherein each server metadata entry associates both an identifier and a server file name, distinct from the identifier, with a respective data object stored on the server system, the server file name including a directory path;
instructions, to be executed during a first phase of a synchronization process, to receive at the server system one or more client metadata entries from a client system, each of the client metadata entries corresponding to a data object stored on the client system for which at least one metadata parameter has changed since a prior execution of the synchronization process, wherein each client metadata entry associates both an identifier and a client file name, distinct from the identifier, with a respective data object stored on the client system, the client file name including a directory path;
instructions, to be executed during the first phase of the synchronization process, to reject at the server system any received client metadata entry that contains one or more updated metadata parameters that conflicts with metadata parameters of a corresponding server metadata entry, and accepting any received client metadata entry that does not conflict a corresponding server metadata entry, wherein a server metadata entry corresponds to a received client metadata entry when the received client metadata entry contains a same identifier as the server metadata entry without regard to whether the server file name and client file name of the server metadata entry and client metadata entry match;
instructions, to be executed during the first phase of the synchronization process, to accept any received client metadata entry for which the server system does not have a corresponding server metadata entry;
instructions, to be executed during a second phase of the synchronization process, to send from the server system to the client system one or more server metadata entries, each of the server metadata entries corresponding to a data object stored on the server system for which at least one metadata parameter has changed since a prior execution of the synchronization process; wherein, when a client metadata entry has been rejected at the server system during the first phase, the one or more server metadata entries sent to the client system include at least one server metadata entry that conflicts with rejected client metadata entry.

20. A client system, comprising:
one or more processors;
memory; and
one or more programs stored in the memory, the one or more programs comprising:
instructions to store, at the client system, client metadata entries corresponding to a plurality of data objects stored on the client system, wherein each client metadata entry associates both an identifier and a client file name, distinct from the identifier, with a respective data object stored on the client system, the client file name including a directory path;
instructions, to be executed during a first phase of a synchronization process, to send, from the client system, one or more client metadata entries to a server system, each of the client metadata entries corresponding to a data object stored on the client system for which at least one metadata parameter has changed since a prior execution of the synchronization process;
instructions, to be executed during a second phase of the synchronization process, to receive at the client system from the server system one or more server metadata entries, each of the server metadata entries corresponding to a data object stored on the server system for which at least one metadata parameter has changed in the server metadata entry since a prior execution of the synchronization process, wherein each server metadata entry associates both an identifier and a server file name, distinct from the identifier, with a respective data object stored on the server system, the server file name including a directory path; wherein, when a client metadata entry has been rejected at the server system during the first phase, the one or more server metadata entries sent to the client system include at least one server metadata entry that conflicts with rejected client metadata entry;
instructions, to be executed during the second phase of the synchronization process, to accept any received server metadata entry for which the client system does not have a corresponding client metadata entry; and
instructions, to be executed during the second phase of the synchronization process, to identify at the client system any received server metadata entry that contains one or more updated metadata parameters that conflicts with metadata parameters of a corresponding client metadata entry, requesting a user to select from among a predefined set of conflict resolutions to resolve the conflict, performing an action in accordance with the conflict resolution selected by the user, and accepting any received client metadata entry that does not conflict a corresponding server metadata entry, wherein a client metadata entry corresponds to a received server metadata entry when the received server metadata entry contains a same identifier as the client metadata entry without regard to whether the server file name and client file name of the server metadata entry and client metadata entry match.

21. The non-transitory computer readable storage medium of claim 17, wherein the one or more programs further comprising instructions for: at the server system, during the first phase of the synchronization process, rejecting any received client metadata entry that specifies a file path for a respective data object stored on the client system that matches the file path specified in a server metadata entry having a different identifier than the received client metadata entry.

22. The non-transitory computer readable storage medium of claim 17, wherein the one or more programs further comprising instructions for: at the server system, during a subsequent phase of the synchronization process, performing a content update operation comprising at least one of a content upload operation and a content download operation.

23. The non-transitory computer readable storage medium of claim 22, wherein the content upload operation comprises uploading to the client system one or more server content updates, each of the server content updates corresponding to a data object stored on the server system for which at least one content parameter has changed since a prior execution of the synchronization process; wherein the one or more server content updates uploaded to the client system are associated with the one or more server metadata entries sent to the client during the second phase of the synchronization process.

24. The non-transitory computer readable storage medium of claim 22, wherein the content download operation comprises downloading from the client one or more client content updates, each of the client content updates corresponding to a data object stored on the client system for which at least one content parameter has changed since a prior execution of the synchronization process; wherein the one or more client content updates downloaded from the client are associated with the one or more client metadata entries received from the client during the first phase of the synchronization process.

25. The non-transitory computer readable storage medium of claim 17, wherein the server system receives the one or more client metadata entries from the client system via a wide area network.

26. The non-transitory computer readable storage medium of claim 17, wherein the server metadata entries stored at the server include a server metadata entry for a respective data object, said server metadata entry comprising data selected from a group consisting of: a data object identifier, an identifier of a parent of said data object, a version number, a data object name, a size of said data object, a size of said data object when encrypted, a checksum, a date and time when said data object was last modified, a date and time when said data object was created, attributes of said data object, flags related to said data object, an indicator of whether said data object is available locally, an indicator of whether the server system has data for said data object, and a timestamp of when said data object was last changed on the server system.

27. The non-transitory computer readable storage medium of claim 18, wherein performing an action in accordance with the conflict resolution selected by the user comprises updating one or more client metadata entries in accordance with the user selected conflict resolution.

28. The non-transitory computer readable storage medium of claim 18, wherein the one or more programs further comprising instructions for: at the client system, during the second phase of the synchronization process, responding to any received server metadata entry that specifies a file path for a respective data object stored on the server system that matches the file path specified in a client metadata entry having a different identifier than the received server metadata entry by requesting a user to select from among the predefined set of conflict resolutions to resolve the conflict, and updating one or more client metadata entries in accordance with the user selected conflict resolution.

29. The non-transitory computer readable storage medium of claim 18, wherein the one or more programs further comprising instructions for: at the client system, during a subsequent phase of the synchronization process, performing a content update operation comprising at least one of a content upload operation and a content download operation.

30. The non-transitory computer readable storage medium of claim 29, wherein the content upload operation comprises uploading to the server system one or more client content updates, each of the client content updates corresponding to a data object stored on the client for which at least one content parameter has changed since a prior execution of the synchronization process; wherein the one or more client content updates uploaded to the server system are associated with the one or more client metadata entries sent to the server system during the first phase of the synchronization process.

31. The non-transitory computer readable storage medium of claim 29, wherein the content download operation comprises downloading from the server system one or more server content updates, each of the server content updates corresponding to a data object stored on the server system for which at least one content parameter has changed since a prior execution of the synchronization process; wherein the one or more server content updates downloaded from the server system are associated with the one or more server metadata entries received from the server system during the second phase of the synchronization process.

32. The non-transitory computer readable storage medium of claim 18, wherein the client system receives the one or more server metadata entries from the server system via a wide area network.

33. The non-transitory computer readable storage medium of claim 18, wherein the server metadata entries stored at the server include a server metadata entry for a respective data object, said server metadata entry comprising data selected from a group consisting of: a data object identifier, an identifier of a parent of said data object, a version number, a data object name, a size of said data object, a size of said data object when encrypted, a checksum, a date and time when said object was last modified, a date and time when said data object was created, attributes of said data object, flags related to said data object, an indicator of whether said data object is available locally, an indicator of whether the server system has data for said data object, and a timestamp of when said data object was last changed on the server system.

34. The non-transitory computer readable storage medium of claim 18, wherein performing an action in accordance with the conflict resolution selected by the user comprises performing an action selected from a group consisting of: modifying a client metadata entry so as to discard a corresponding data object stored on the client system, modifying a client metadata entry so as to overwrite a corresponding data object stored on the server system with a client data object identified by the client metadata entry, renaming a data object stored on the client system, moving a data object stored on the client system, and copying a data object stored on the client system.

35. The data objects synchronization system of claim 19, wherein the one or more programs further comprising instructions for: at the server system, during the first phase of the synchronization process, rejecting any received client metadata entry that specifies a file path for a respective data object stored on the client system that matches the file path specified in a server metadata entry having a different identifier than the received client metadata entry.

36. The data objects synchronization system of claim 19, wherein the one or more programs further comprising instructions for: at the server system, during a subsequent phase of the synchronization process, performing a content update operation comprising at least one of a content upload operation and a content download operation.

37. The data objects synchronization system of claim 36, wherein the content upload operation comprises uploading to the client system one or more server content updates, each of the server content updates corresponding to a data object stored on the server system for which at least one content parameter has changed since a prior execution of the synchronization process; wherein the one or more server content updates uploaded to the client system are associated with the one or more server metadata entries sent to the client system during the second phase of the synchronization process.

38. The data objects synchronization system of claim 36, wherein the content download operation comprises downloading from the client system one or more client content updates, each of the client content updates corresponding to a data object for which at least one content parameter has changed since a prior execution of the synchronization process; wherein the one or more client content updates downloaded from the client system are associated with the one or more client metadata entries received from the client system during the first phase of the synchronization process.

39. The data objects synchronization system of claim 19, wherein the server system receives the one or more client metadata entries from the client system via a wide area network.

40. The data objects synchronization system of claim 19, wherein the server metadata entries stored at the server include a server metadata entry for a respective data object, said server metadata entry comprising data selected from a group consisting of: a data object identifier, an identifier of a parent of said data object, a version number, a data object name, a size of said data object, a size of said data object when encrypted, a checksum, a date and time when said data object was last modified, a date and time when said data object was created, attributes of said data object, flags related to said data object, an indicator of whether said data object is available locally, an indicator of whether the server system has data for said data object, and a timestamp of when said data object was last changed on the server system.

41. The client system of claim 20, wherein performing an action in accordance with the conflict resolution selected by the user comprises updating one or more client metadata entries in accordance with the user selected conflict resolution.

42. The client system of claim 20, wherein the one or more programs further comprising instructions for: at the client system, during the second phase of the synchronization process, responding to any received server metadata entry that specifies a file path for a respective data object stored on the server system that matches the file path specified in a client metadata entry having a different identifier than the received server metadata entry by requesting a user to select from among the predefined set of conflict resolutions to resolve the conflict, and updating one or more client metadata entries in accordance with the user selected conflict resolution.

43. The client system of claim 20, wherein the one or more programs further comprising instructions for: at the client system, during a subsequent phase of the synchronization process, performing a content update operation comprising at least one of a content upload operation and a content download operation.

44. The client system of claim 43, wherein the content upload operation comprises uploading to the server system one or more client content updates, each of the client content updates corresponding to a data object stored on the client system for which at least one content parameter has changed since a prior execution of the synchronization process; wherein the one or more client content updates uploaded to the server system are associated with the one or more client metadata entries sent to the server system during the first phase of the synchronization process.

45. The client system of claim 43, wherein the content download operation comprises downloading from the server system one or more server content updates, each of the server content updates corresponding to a data object stored on the server system for which at least one content parameter has changed since a prior execution of the synchronization process; wherein the one or more server content updates downloaded from the server system are associated with the one or more server metadata entries received from the server system during the second phase of the synchronization process.

46. The client system of claim 20, wherein the client system receives the one or more server metadata entries from the server system via a wide area network.

47. The client system of claim 20, wherein the server metadata entries stored at the server include a server metadata entry for a respective data object, said server metadata entry comprising data selected from a group consisting of: a data object identifier, an identifier of a parent of said data object, a version number, a data object name, a size of said data object, a size of said data object when encrypted, a checksum, a date and time when said data object was last modified, a date and time when said data object was created, attributes of said data object, flags related to said data object, an indicator of whether said data object is available locally, an indicator of whether the server system has data for said data object, and a timestamp of when said data object was last changed on the server system.

48. The client system of claim 20, wherein performing an action in accordance with the conflict resolution selected by the user comprises performing an action selected from a group consisting of: modifying a client metadata entry so as to discard a corresponding data object stored on the client system, modifying a client metadata entry so as to overwrite a corresponding data object stored on the server system with a data object identified by the client metadata entry, renaming a data object stored on the client system, moving a data object stored on the client system, and copying a data object stored on the client system.

* * * * *

UNITED STATES PATENT AND TRADEMARK OFFICE
CERTIFICATE OF CORRECTION

| | |
|---|---|
| PATENT NO. | : 8,311,981 B2 |
| APPLICATION NO. | : 12/435317 |
| DATED | : November 13, 2012 |
| INVENTOR(S) | : Braginsky et al. |

It is certified that error appears in the above-identified patent and that said Letters Patent is hereby corrected as shown below:

In column 13, line 56, please delete "of" and add -- of: --;

In column 18, line 62, please delete "client" and add -- server --;

In column 18, line 63, please delete "server" and add -- client --;

In column 19, lines 4-5, please delete "comprising" and add -- comprise --;

In column 19, lines 12-13, please delete "comprising" and add -- comprise --;

In column 19, lines 61-62, please delete "comprising" and add -- comprise --;

In column 20, line 63, please delete "comprising" and add -- comprise --;

In column 21, line 4, please delete "comprising" and add -- comprise --;

In column 21, line 53, please delete "comprising" and add -- comprise --;

In column 22, line 5, please delete "comprising" and add -- comprise --.

Signed and Sealed this
Eighth Day of January, 2013

David J. Kappos
*Director of the United States Patent and Trademark Office*